(12) United States Patent
Wang

(10) Patent No.: US 10,392,085 B2
(45) Date of Patent: Aug. 27, 2019

(54) REMOTE OPERATED VEHICLE FOR SELECTIVELY HARVESTING TARGET SPECIES

(71) Applicant: American Marine Research Company, Pensacola, FL (US)

(72) Inventor: Yuan Wang, Pensacola, FL (US)

(73) Assignee: American Marine Research Company, Pensacola, FL (US)

(*) Notice: Subject to any disclaimer, the term of this patent is extended or adjusted under 35 U.S.C. 154(b) by 0 days.

(21) Appl. No.: 16/235,008

(22) Filed: Dec. 28, 2018

(65) Prior Publication Data

US 2019/0202531 A1 Jul. 4, 2019

Related U.S. Application Data

(60) Provisional application No. 62/612,298, filed on Dec. 29, 2017.

(51) Int. Cl.
*B63B 35/26* (2006.01)
*B63G 8/00* (2006.01)
(Continued)

(52) U.S. Cl.
CPC .............. *B63B 35/26* (2013.01); *A01K 75/04* (2013.01); *A01K 99/00* (2013.01); *B63G 8/001* (2013.01); *B63G 2008/007* (2013.01)

(58) Field of Classification Search
CPC ....... B63B 35/265; B63B 35/26; B63G 8/001; A01K 75/04; A01K 99/00
See application file for complete search history.

(56) References Cited

U.S. PATENT DOCUMENTS 4,251,943 A * 2/1981 Sawlsville ............. A01K 97/20
43/55
9,207,039 B1 12/2015 Price
(Continued)

OTHER PUBLICATIONS

"Worlds First Eco Robot Protecting Reefs from Lionfish," RSE Technology, https://www.kickstarter.com/projects/rse/worlds-first-eco-robot-protecting-reefs-from-lionf, Wayback Machine from Oct. 2, 2017.
(Continued)

*Primary Examiner* — Stephen P Avila
(74) *Attorney, Agent, or Firm* — Finnegan, Henderson, Farabow, Garrett & Dunner, L.L.P.

(57) ABSTRACT

A remote operated vehicle for selectively harvesting a target species in an aquatic environment is disclosed. The vehicle may include a chassis defining a central channel and being configured to hold a plurality of attachments mounted to the chassis. The plurality of attachments may include at least one thruster configured to propel the vehicle in the aquatic environment, and at least one electronics containment unit configured to store one or more electronic devices for controlling an operation of the vehicle. The vehicle may also include a containment unit connected to the chassis and configured to store the target species during harvesting, and at least one stunning device configured to stun the target species. The vehicle may further include at least one suction device positioned at a rear portion of the chassis and being configured to generate flow in a direction extending through the channel to cause the target species to flow into the containment unit.

19 Claims, 6 Drawing Sheets

(51) Int. Cl.
  *A01K 99/00* (2006.01)
  *A01K 75/04* (2006.01)

(56) References Cited

U.S. PATENT DOCUMENTS

2007/0166107 A1* 7/2007 Jacobsen ............... E02F 3/8866
                                                          405/185
2012/0102811 A1  5/2012 Waugh
2016/0278353 A1  9/2016 Martin et al.

OTHER PUBLICATIONS

Lloyd, Matthew, "RSE Unveils Guardian LF1 Undersea Robot and Launches Kickstarter Campaign," Apr. 19, 2017.

* cited by examiner

REMOTE OPERATED VEHICLE FOR SELECTIVELY HARVESTING TARGET SPECIES

RELATED APPLICATIONS

This application claims priority to U.S. Provisional Application No. 62/612,298, filed Dec. 29, 2017, which is incorporated herein by reference in its entirety.

TECHNICAL FIELD

Embodiments of the present disclosure generally relate to remote operated vehicles and methods for operating remove operated vehicles. More particularly, embodiments of the present disclosure relate to remote operated vehicles and methods thereof used in the selective harvest of a target species in an aquatic environment.

BACKGROUND

The overpopulation of certain species can pose a threat to marine life and their ecosystems. For example, in recently years, lionfish populations have become difficult to control in certain areas, leading many fishermen and divers to target them in attempt to reduce their population numbers. However, these fishermen and divers do not currently have the resources to significantly reduce population numbers. In particular, the existing technology lacks the ability to provide selective harvesting in large quantities, while also enabling efficient collection and without significantly increasing costs.

Methods for capturing lionfish up to this point have included using spears and other tools to capture the fish and bring them to the surface individually or in limited quantities. These methods are insufficient to be implemented in large scale operations. There also have been a few attempts to develop remotely operated vehicles, also known as ROVs, that function in an aquatic environment and are capable of seeking, approaching, and capturing the lionfish. But, thus far, the ROVs have had many operational difficulties and have not been suitable for large scale operations.

One known ROV implements a hook and line method using bait, but the bait attractant is non-specific and lures many fish species. In addition, this method can only capture a limited number of fish (e.g., one per baited line), and it also runs the risk of being carried away by a captured fish attempting to escape. Another known ROV uses a retractable spear to stab fish and pull them into a container. However, this ROV is not very effective because it has a large frontal profile, which reduces agility, and smaller bucket size, which prevents large quantities of fish from being captured at a time. It is also a complex design with a lot of moving parts, which reduces reliability and increases costs. Another known ROV uses twin electrode panels to stun the lionfish and bucket-type collection. This ROV also has a suction device at the front of the vehicle that draws the fish into the bucket after it is stunned. This system has several drawbacks. Like the other known ROVs, the ROV's capacity is limited to the size of the bucket, which prevents the user from capturing large quantities of lionfish, causing frequent water surfacing. The large frontal profile of the bucket chassis also limits the speed and agility of the device. Additionally, the suction device location at the front of the ROV limits its effectiveness, and during harvesting operations, fish in the bucket can interfere with the suction device. Finally, all prior ROVs discussed above have poor modularity and do not allow an operator to easily add, change, and/or remove parts between operations.

The disclosed remote operated vehicle and methods thereof are directed to overcoming one or more of the problems set forth above and/or other problems of the prior art.

SUMMARY

One aspect of the present disclosure is directed to a remote operated vehicle for selectively harvesting a target species in an aquatic environment. The vehicle may include a chassis defining a central channel and being configured to hold a plurality of attachments mounted to the chassis. The plurality of attachments may include at least one thruster configured to propel the vehicle in the aquatic environment, and at least one electronics containment unit configured to store one or more electronic devices for controlling an operation of the vehicle. The vehicle may also include a containment unit connected to the chassis and configured to store the target species during harvesting, and at least one stunning device configured to stun the target species. The vehicle may further include at least one suction device positioned at a rear portion of the chassis and being configured to generate flow in a direction extending through the channel to cause the target species to flow into the containment unit.

Another aspect of the present disclosure is directed to another remote operated vehicle for selectively harvesting a target species in an aquatic environment. The vehicle may include a chassis defining a central channel and being configured to hold a plurality of attachments mounted to the chassis. The plurality of attachments may include at least one thruster configured to propel the vehicle in the aquatic environment, and at least one electronics containment unit configured to store one or more electronic devices for controlling an operation of the vehicle. The vehicle may also include a containment unit connected to the chassis and configured to store the target species during harvesting, and at least one stunning device configured to stun the target species. The vehicle may further include a first suction device positioned at a rear portion of the chassis and being configured to generate flow in a direction extending through the channel to cause the target species to flow into the containment unit, and a second suction device positioned at a front portion of the chassis and being configured to generate flow in the same direction as the first suction device.

Yet another aspect of the present disclosure is directed to method of operating a remote operated vehicle for selectively harvesting of a target species in an aquatic environment. The method may include propelling the vehicle in the aquatic environment to locate the target species, and generating an electric current to stun the target species. The method may also include generating a first flow from a rear portion of the vehicle in a direction extending through a chassis of the vehicle, and generating a second flow from a front portion of the vehicle in the same direction as the first flow. The method may further include capturing the target species in a containment unit.

Additional features of the disclosure will be set forth in part in the description that follows, and in part will be obvious from the description, or may be learned by practice of the disclosed embodiments.

It is to be understood that both the foregoing general description and the following detailed description are exemplary and explanatory only, and are not restrictive of the invention, as claimed.

Technical elements of the foregoing summary are sometimes described in combination with other technical details as a short hand only. It is to be understood that inventive aspects are considered to lie in each individual technical detail, either alone or in combination with one or more other of the technical details. Thus, all permutations and combinations of elements described above are to be considered as within the scope of the invention.

BRIEF DESCRIPTION OF THE DRAWINGS

The accompanying drawings, which are incorporated in and constitute a part of this specification, illustrate several embodiments of the disclosure and, together with the description, serve to explain the principles of the embodiments disclosed herein.

DETAILED DESCRIPTION

Reference will now be made in detail to exemplary embodiments of the present disclosure, examples of which are illustrated in the accompanying drawings. Wherever possible, the same reference numbers will be used throughout the drawings to refer to the same or like parts.

Figure 1:
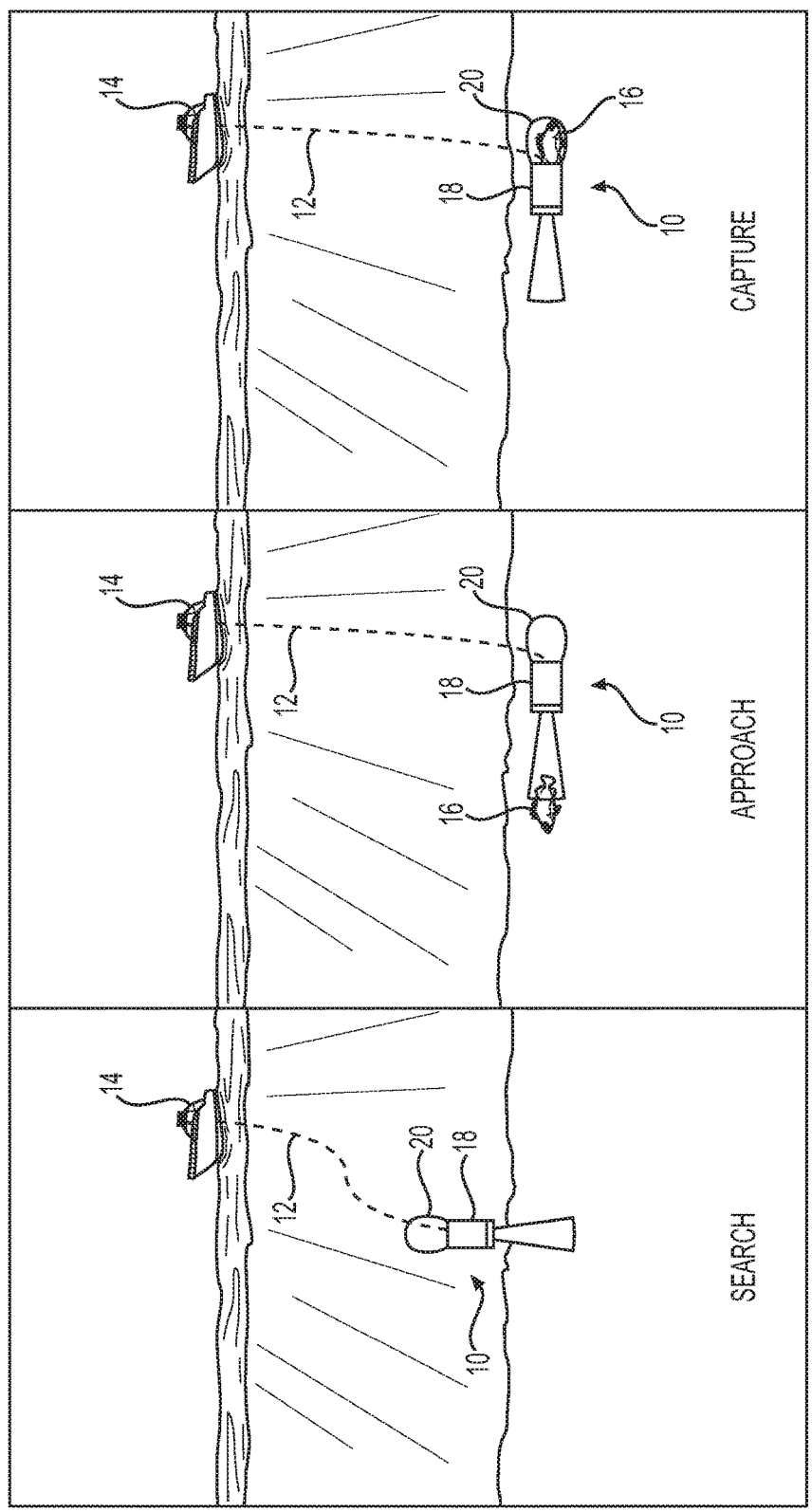
FIG. 1 includes three schematic illustrations of a remote operated vehicle in an aquatic environment, according to an exemplary embodiment of the present disclosure.

FIG. 1 illustrates an exemplary remote operated vehicle (ROV) 10 that may be attached via a tether 12 to a control system (not shown) located on a boat 14. As will be discussed in more detail below, ROV 10 may be used to search for, approach, and capture one or more target species 16 (e.g., lionfish).

As shown in FIG. 1, ROV 10 may include, among other things, a chassis 18 and a containment unit 20. Chassis 18 may be configured to hold a plurality of attachments for navigating ROV 10 and capturing the target species 16. Containment unit 20 may include a cage, a bucket, a net, or any other storage device configured to store the target species 16 once captured. Containment unit 20 may be mounted to chassis 18 during operation.

In some embodiments, containment unit 20 may be removable, such that it can be replaced with a new containment unit 20 while ROV 10 continues a harvesting operation. For example, in one embodiment, a plurality of nets (or another type of containment unit) may be used with ROV 10. Once one net is full, it may be removed and configured to float to the surface for collection (e.g., using a floatation device), while ROV 10 continues filling the other nets. The use of a plurality of removable containment units may allow ROV 10 to continuously capture the target species 16, without having to carry an excessive load.

In the disclosed embodiment, the operation of ROV 10 may be controlled by a user on boat 14 or at some other remote location. In particular, the use of tether 12 may allow the user to control ROV 10 from above water. It is contemplated, however, that in other embodiments ROV 10 may instead be controlled wirelessly (i.e., without using a tether) to increase the range of vehicle operation and eliminate the hassle of using a long tether. In addition, it is also contemplated that ROV 10 may instead be autonomous and programmed to operate in a specific manner, which can help to reduce human error and improve efficiency.

Figure 2:
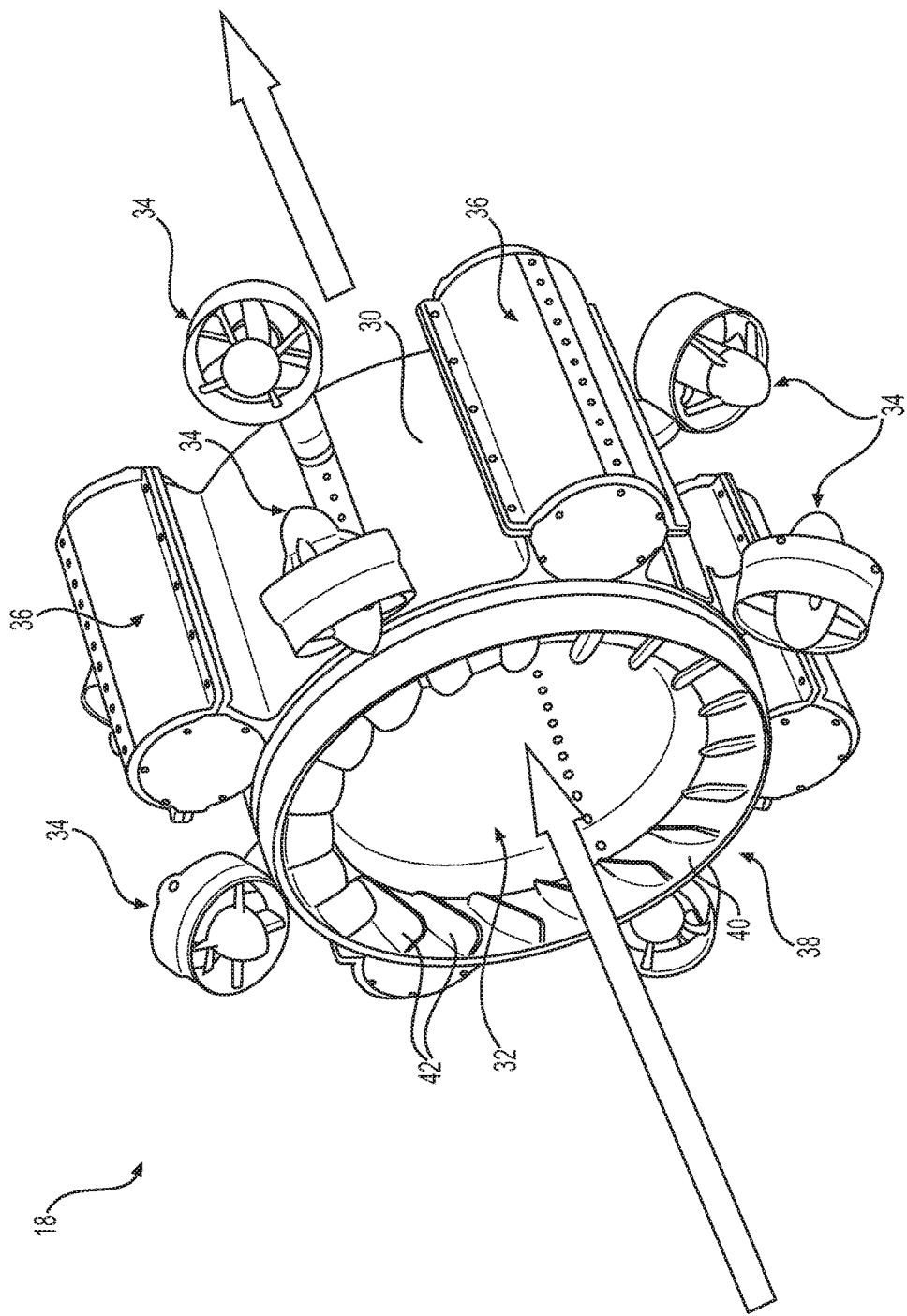
FIG. 2 is an isometric illustration of a chassis portion of a remote operated vehicle, according to an exemplary embodiment of the present disclosure.

FIG. 2 illustrates an exemplary chassis 18 that may be used with ROV 10. As shown in FIG. 2, chassis 18 may have a generally cylindrical body 30 defining a central channel 32. In one embodiment, body 30 may have an inner diameter of 16" and an outer diameter of 18". Although not specifically shown in FIG. 2, body 30 may also have a number of holes and/or gaps to reduce drag and improve speed and agility of ROV 10 in the water. The holes and/or gaps may also help with lateral movement and reduce the overall weight of ROV 10, which can reduce the amount of power necessary to propel ROV 10.

As shown in FIG. 2, a plurality of attachments may be mounted on body 30. For example, chassis 18 may be equipped with a plurality of thrusters 34 and a plurality of electronics containment units 36. Thrusters 34 may be configured to propel ROV 10 in the water, while electronics containment units 36 may store one or more electronic devices that are configured to control and power the operation of ROV 10. Other attachments may also be mounted to body 30, if desired. For example, in some embodiments, one or more propellers (not shown) may be mounted to body 30 to help navigate ROV 10 in the water.

In some embodiments, thrusters 34 may be equally spaced around body 30. As shown in FIG. 2, for example, there may be eight thrusters 34 with pairs of thrusters 34 being aligned at four equally spaced locations around body 30. In each pair of thrusters 34, one thruster 34 may be facing in a forward direction, while the other thruster 34 is facing in a backward direction. This arrangement allows greater freedom of movement and the ability to move between forwards and backwards directions quickly.

In one embodiment, thrusters 34 may be equiangular drive thrusters. In addition, each thruster 34 may be oriented at a 45-degree angle relative to a central axis of body 30 and oriented at a 15-degree angle relative to a mounting surface of body 30. This specific orientation may provide ROV 10 with greater control of motion and increased maneuverability. While the specific number of thrusters and angles of orientation described above may be advantageous, it is also contemplated that other embodiments may utilize a different number of thrusters and different angles of orientation, depending on the desired operation.

The electronic devices stored in electronics containment units 36 may include one or more of the following: lights, sensors, cameras, batteries, controllers, and any other electronic devices that may be used to help control and power ROV 10 during aquatic environments. For example, lights may be mounted to a front of chassis 18 to increase visibility in darker areas. A camera may be mounted to the front of chassis 18 to transmit live imaging to the user. One or more sensors, such as accelerometers and/or gyroscopes, may be used to detect a position and orientation of ROV 10 and help determine the correct adjustments to be made. In addition, one or more batteries may be stored on ROV 10 to provide power to various components mounted on chassis 18. One or more controller(s) may also be located onboard ROV 10 to control different operations of ROV 10. The onboard controller(s) may be in communication with an offboard controller located, for example, on boat 14 to allow a user to operate ROV 10 from the boat 14.

The controller(s) may embody single or multiple microprocessors, field programmable gate arrays (FPGAs), digital signal processors (DSPs), etc., that are configured to control the operation of ROV 10 in response to user input. For example, the controller(s) may control thrusters 34, electronic devices, and any other attachments mounted on ROV 10 to control different functions of the ROV 10. In some embodiments, the controller may also be configured to control the operation of ROV 10 in response to signals received from the sensors, built-in constraints, sensed operational parameters, and/or communicated instructions from another ROV. Numerous commercially available microprocessors can be configured to perform the functions of these components. Various known circuits may be associated with these components, including power supply circuitry, signal-conditioning circuitry, actuator driver circuitry (i.e., circuitry powering solenoids, motors, or piezo actuators), and communication circuitry.

The controller may also include any means for monitoring, recording, storing, indexing, processing, and/or communicating various operational aspects of the aquatic environment and ROV 10. These means may include components such as, for example, a memory, one or more data storage devices, a central processing unit, or any other components that may be used to run an application. Furthermore, although aspects of the present disclosure may be described generally as being stored in memory, one skilled in the art will appreciate that these aspects can be stored on or read from different types of computer program products or computer-readable media such as computer chips and secondary storage devices, including hard disks, floppy disks, optical media, CD ROM, or other forms of RAM or ROM.

Although not shown in FIG. 2, thrusters 34 may be electrically connected to the electronic devices via one or more cables suitable for aquatic operations. The cables may be threaded through one or more holes (not shown) in electronics containment units 36. These holes may be sealed with marine epoxy or any known adhesive suitable for aquatic operations and plugged when not in use. In addition, desiccants, such as silica gel, may be provided inside electronics containment units 36 to absorb any condensation that may form on walls, especially when operating in colder environments. In all operational environments, electronics containment units 36 may be tightly sealed to prevent water from entering the units.

In addition to the components described above, ROV 10 may also be equipped with one or more suction devices. The suction devices may be configured to generate flow in a direction extending through channel 32, thereby providing suction to pull the target species 16 through channel 32 and into a containment unit (not shown in FIG. 2). For example, as shown in FIG. 2, the suction device may be a rim-driven propeller 38 mounted to a front portion of body 30. Rim-driven propeller 38 may include an annular plate 40 that extends around a periphery of body 30, and a plurality of blades 42 equally spaced around annular plate 40. Blades 42 may be configured to move in either a clockwise or counterclockwise direction to generate a flow, thereby suctioning the target species 16 into channel 32. Similar to thrusters 34, rim-driven propeller 38 may be electrically connected to one or more of the electronic devices to control its operation. During operation, rim-driven propeller 38 may be continuously drawing suction or it may instead draw suction in response to a user's input.

Figure 3:
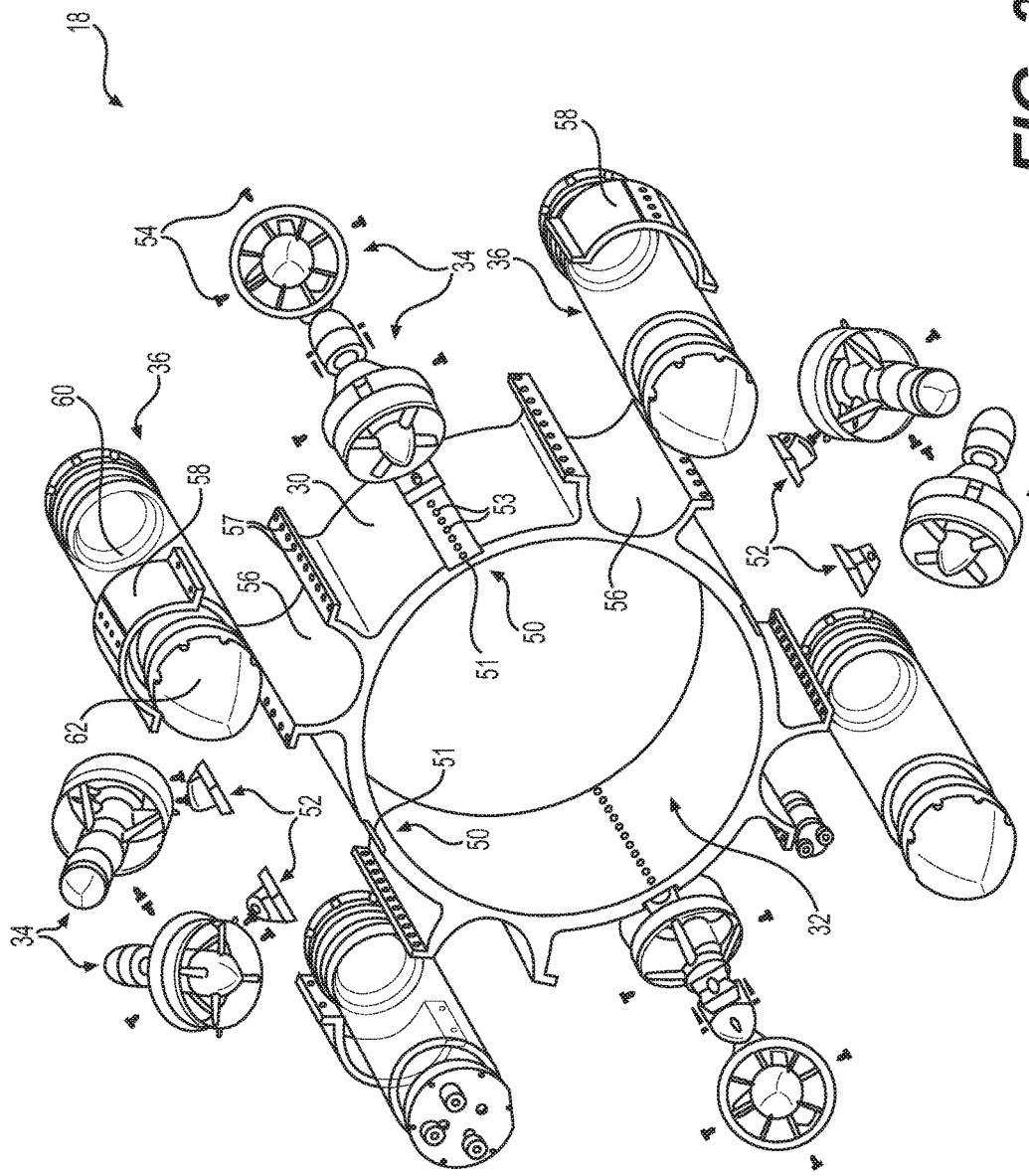
FIG. 3 is an exploded view illustration of a chassis portion of a remote operated vehicle, according to an exemplary embodiment of the present disclosure.

FIG. 3 illustrates an exploded view of chassis 18, but with rim-driven propeller 38 removed for clarity. As shown in FIG. 3, chassis 18 may be provided with a plurality of attachment features configured to mount a plurality of attachments to chassis 18. For example, the plurality of attachment features may include one or more connecting rails 50 configured to hold the attachments. In the disclosed embodiment, connecting rails 50 are configured to hold a plurality of thrusters 34. However, in other embodiments, connecting rails 50 may be used to mount electronics containment units 36 containing any combination of cameras, sensors, or any other electronics devices, as desired.

In some embodiments, each connecting rail 50 may include a groove 51 configured to receive one or more joints 52 connected to thrusters 34. Both grooves 51 and joints 52 may have a dovetail shape to allow the attachments to be easily installed and removed. Connecting rails 50 may also have a plurality of holes 53 spaced out along grooves 51 to receive one or more corresponding screws 54 for mounting joints 52 with corresponding thrusters 34 to body 30. There are four connecting rails 50 shown in the disclosed embodiment. However, it is contemplated that there may be any number of connecting rails, as desired.

Chassis 18 may also be provided with one or more cradles 56 configured to hold, for example, electronics containment units 36. Cradles 56 may have a generally U-shape that substantially corresponds to the shape of electronics containment units 36. One or more clamps 58 may be provided to strap electronics containment units 36 down and secure them to cradles 56. Like with joints 52, screws 54 may be inserted into holes 57 along cradles 56 to attach clamps 58. In the disclosed embodiment, there may be four cradles 56 with corresponding clamps 58. However, it is contemplated that there may be any number of cradles, as desired.

The use of connecting rails 50 and/or cradles 56 may allow an operator to easily add, change, or remove parts and/or adjust configurations depending on operational parameters and user preferences. For example, additional thrusters 34 may be required when there are heavy water currents, or alternatively, fewer thrusters 34 may be required when the user prefers to improve speed and agility and reduce the overall weight of ROV 10. In each case, the attachment features in the disclosed embodiments may allow the operator to quickly change parts and reduce the amount of downtime. As a result, the disclosed attachment features can provide greater modularity and efficiency of operation than other known ROVs. Connecting rails 50 may also provide plenty of space for many different kinds of attachments, which improves flexibility of design and enhances the ability to interchange parts easily.

As shown in FIG. 3, some electronics containment units 36 may have a transparent body 60 allowing an operator to see inside the units. In one embodiment, body 60 may be made of acrylic plastic. Electronics containment units 36 may also have a removable cap 62 that has a generally pointed nose. The removability of cap 62 may also contribute to the ease of assembly and replacement of parts. The pointed nose may provide a more hydrodynamic shape to reduce drag on ROV 10.

Figure 4:
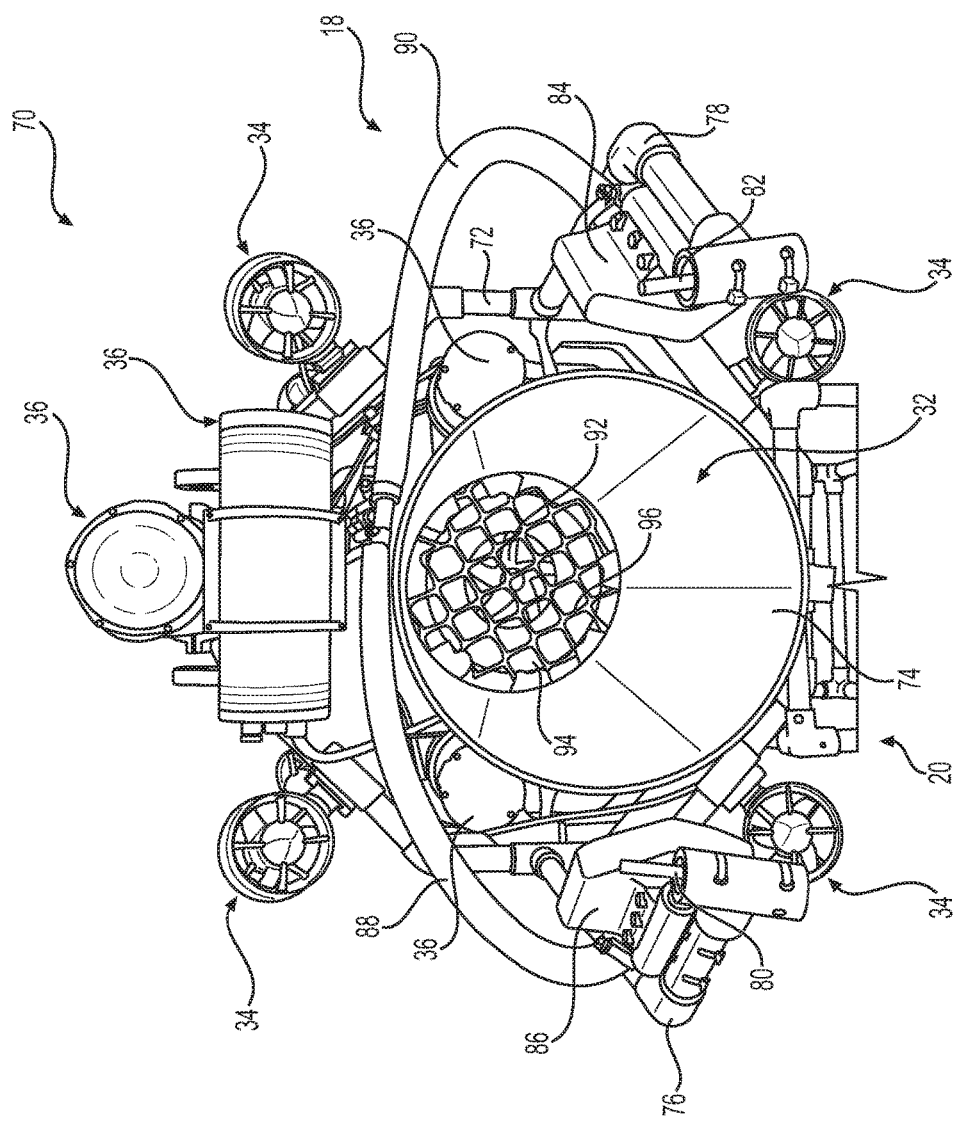
FIG. 4 is an isometric illustration of a remote operated vehicle, according to an exemplary embodiment of the present disclosure.

FIG. 4 illustrates another exemplary remote operated vehicle (ROV) 70. Like ROV 10, ROV 70 also includes a chassis 18 and a containment unit 20. ROV 70 may also include a plurality of attachments, such as thrusters 34 and electronics containment units 36, mounted to chassis 18. ROV 70 may however include a different body 72 than body 30 of ROV 10. In particular, body 72 may have a plurality of annular and straight beams connected to form a generally cylindrical frame. Body 72 may be generally open compared to body 30 to reduce the overall weight of ROV 70 and improve the speed and agility of ROV 70. As shown in FIG. 4, containment unit 20 of ROV 70 may be in the form of a bucket 74 that defines channel 32. As shown, bucket 74 may be housed within body 72, such that body 72 surrounds the outside of bucket 74.

In addition to thrusters 34 and electronics containment units 36, there may be a number of additional components mounted to ROV 70 for assisting with capturing the target species 16. For example, ROV 70 may be equipped with one or more stunning devices and one or more suction devices mounted to chassis 18. The stunning devices may be configured to stun the target species 16, while the suction devices may be configured to generate a flow in a direction extending through channel 32, causing the target species 16 to be drawn towards containment unit 20.

As shown in FIG. 4, one exemplary stunning device may include a pair of arms 76, 78 extending from a front portion of chassis 18 to a position out in front of ROV 70, and a pair of electrode 80, 82 positioned at the end of arms 76, 78. When activated, electrodes 80, 82 may be configured to generate an electric current, which stuns the target species 16 by interfering with its nervous system and thereby incapacitating it. In some embodiments, electrodes 80, 82 may be controlled by an operator via the controller(s), and in other embodiments, the controller(s) may be programmed to cause electrodes 80, 82 to automatically generate an electric current in response to, for example, signals from one or more sensors sensing the presence of the target species 16. The electric current from electrodes 80, 82 may be continuous or pulsed, depending on the desired operation.

Once incapacitated, the target species may be sucked into containment unit 20 via one or more suction devices. For example, as shown in FIG. 4, one exemplary suction device may be a pair of spray heads 84, 86 also attached to arms 76, 78 at a front portion of ROV 70. Spray heads 84, 86 may be configured to receive fluid (e.g., water) from corresponding hoses 88, 90, and spray the fluid in a direction towards containment unit 20, when triggered by a user or in response to sensed data. The sprayed fluid may cause a flow in a direction towards containment unit 20, which traps the target species 16 in containment unit 72. The fluid may be ocean water or any other fluid stored in a container mounted on ROV 70.

In addition to the suction devices located at the front of ROV 70, ROV 70 may also include one or more suction devices positioned at its rear. For example, a rear thruster 92 may be mounted to a rear wall 94 of containment unit 20. Rear thruster 92 may be configured to generate flow in a direction extending through channel 32 to draw the target species 16 into containment unit 20. This direction may be the same direction as the direction of flow caused by spray heads 86, 88. As shown in FIG. 4, netting 96 may be located in front of rear thruster 92 to protect the target species 16 from getting caught in the thruster 92, and protect the thruster 92 as well. In other embodiments, however, netting 96 may be located in back of rear thruster 92 or the netting may be removed entirely. Rear thruster 92 may also prevent the captured target species 16 from escaping once it is in containment unit 20 by continuously generating flow to keep the target species 16 in containment unit 20 and against back wall 94. Alternatively or in addition, rear thruster 94 may also serve to propel ROV 70, for example, when no target species 16 are in containment unit 20.

Figure 5:
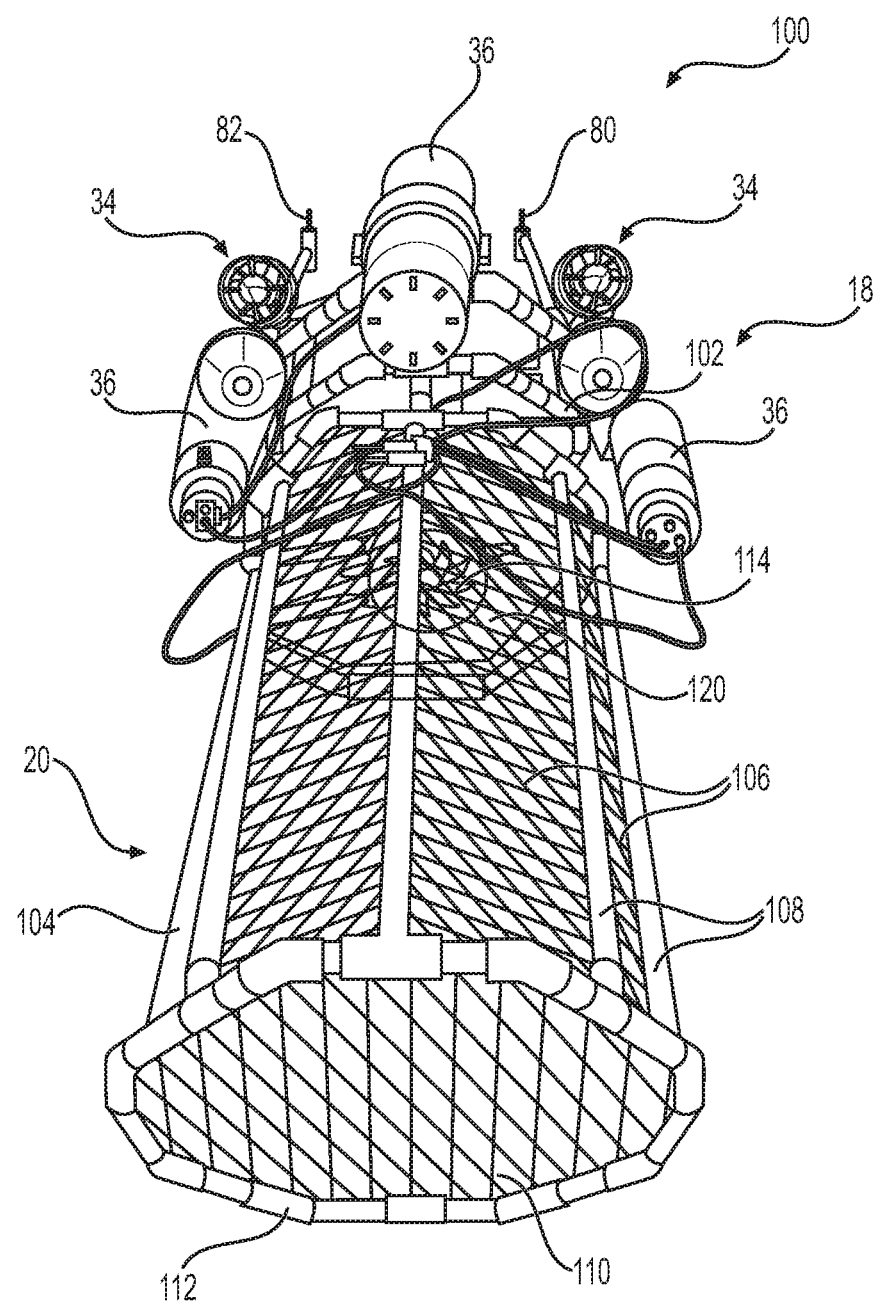
FIG. 5 is an isometric illustration of a remote operated vehicle, according to an exemplary embodiment of the present disclosure.

FIG. 5 illustrates another exemplary remote operated vehicle (ROV) 100. Like ROV 70, ROV 100 may include chassis 18 and containment unit 20, but their size, shape, and location may be different. ROV 100 may also include thrusters 34, electronics containment units 36, similar stunning devices (e.g., electrodes 80, 82), and similar suction devices (not shown) mounted to chassis 18. Chassis 18 of ROV 100 may also include a similar body 102 as ROV 70.

One difference between ROV 70 and ROV 100 is with containment unit 20. As shown in FIG. 5, containment unit 20 of ROV 100 may be in the form of a cage 104 extending from a rear portion of body 102 to a position behind ROV 100. Cage 104 may have a plurality of side walls 106 supported by straight beams 108 connecting adjacent walls 106. In addition, cage 104 may include a rear wall 110 that is connected to side walls 106 via an annular beam 112. In the disclosed embodiment, cage 104 may be constructed from rigid material and have a plurality of holes to reduce drag on ROV 100, while still preventing the target species 16 from escaping. Cage 104 may be expanded to accommodate a greater number of the target species 16 and/or bigger target species 16. In one embodiment, cage 104 may use plastic fencing material and a PVC frame. In another embodiment, the frame can also be constructed from aluminum.

It is contemplated that in other embodiments, the containment unit 20 may instead be in the form of nylon netting. The netting may have sleeves of flexible netting which are spooled around the edge of the chassis and released as netting is used up in order to increase the capacity of the net. This arrangement may enable ROV 100 to travel without being weighed down by the weight of previously captured target species 16.

Figure 6:
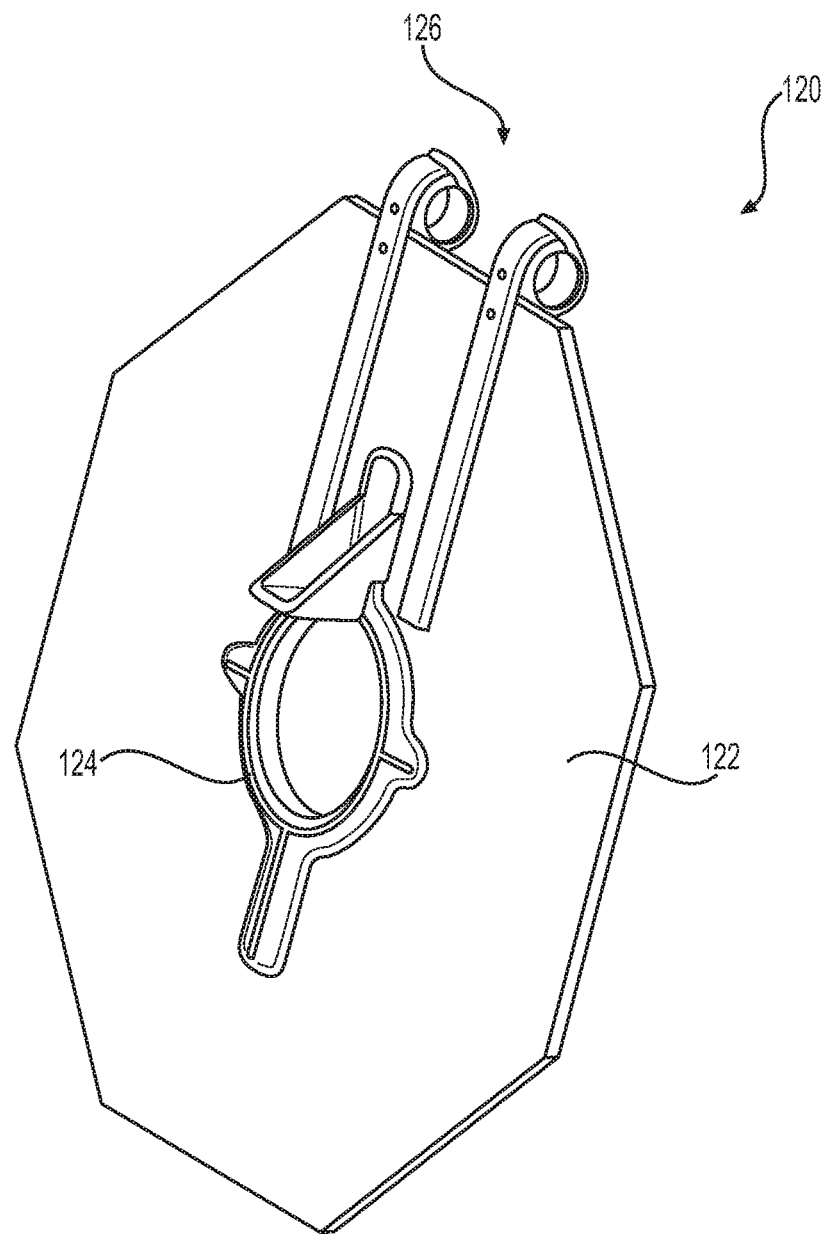
FIG. 6 is an isometric illustration of a trapdoor that may be used in conjunction with the remote operated vehicle of FIG. 5, according to an exemplary embodiment of the present disclosure.

In some embodiments, after the target species 16 is captured within body 102, a rear thruster 114 may cause a trapdoor 120 to open a path to cage 104. Trapdoor 120 may be disposed at a location in between chassis 18 and containment unit 20. Referring to FIG. 6, trapdoor 120 may be a plate 122 having an opening 124 configured to receive rear thruster 114. Trapdoor 120 may also include a hinge 126 configured to connect trapdoor 120 to chassis 18.

In some embodiments, trapdoor 120 may be controlled by the controller(s) and activated in response to a signal from a user. Alternatively, a sensor located in channel 32 may send a signal to the controller(s) to cause the opening of trapdoor 120 when the target species 16 is present, in order to allow it to pass through channel 32 and into cage 104. Trapdoor 120 may then close to trap the target species 16 within cage 104. To open and close trapdoor 120, rear thruster 114 may be activated to force trapdoor 120 in the desired direction. Alternatively, trapdoor 120 may also be activated to open or close by its own buoyancy. During operations where no target species 16 are yet captured, trapdoor 120 may be in the open position to reduce the drag and improve the hydrodynamics of the ROV 100.

As with other suction devices mentioned above, rear thruster 94 may also accelerate the travel of the fish into containment unit 20. For example, in addition to opening and closing trapdoor 120, rear thruster 94 may also be activated to generate flow in a direction extending through channel 32, causing the target species 16 to get trapped in containment unit 120. It is contemplated that other suction devices, such as, rim-drive propeller 38 may also be used with trapdoor 120 to further improve suctioning abilities.

The use of trapdoor 120 may separate the capture and containment portions of ROV 100 and thereby allow continuous capture without being affected by prior captures. This arrangement may enable large quantities of the target species to be captured during one harvesting operation.

Methods of operating ROVs 10, 70, and 100 will now be described, with reference to FIGS. 1-6. Once in the water, the ROV may be controlled, either by a user or autonomously, to navigate in the aquatic environment using thrusters 34. A camera and lighting mounted on the ROV may assist in locating one or more target species 16. To capture the target species 16, the ROV may approach the target species 16 and position itself close to the target species. Once within range of the target species 16, one or more stunning devices (e.g., electrodes 80, 82) may be activated to stun the target species 16, thereby incapacitating it. Thrusters 34 may then move the ROV forward so that the target species passes through channel 32 and is captured in containment unit 20. Alternatively or in addition, one or more suction devices located at the front of the ROV (e.g., rim-driven propeller 38 and spray heads 86, 88) and/or at the rear of the ROV (e.g., rear thrusters 94, 114) may be activated to draw the target species through channel 32 and into containment unit 20. In particular, a first flow may be generated from the front of the ROV and/or a second flow may be generated from the rear of the ROV in a direction extending through channel 32 to cause the target species 16 to be trapped in containment unit 20. In some embodiments, trapdoor 120 may be opened or closed by activating rear thruster 114 to allow the target species 16 to travel into containment unit 20. The target species 16 may remain in the containment unit 20, while the ROV continues to search for and capture more of the target species 16. After collecting a desired amount of target species 16, the ROV may bring the captured target species 16 to the water surface.

The disclosed ROVs are applicable to any aquatic operation. The ROVs are particularly useful for hunting and capturing targeted species, such as lionfish. As the disclosed embodiments above illustrate, the disclosed ROVs improve modularity compared to previously known ROVs. In particular, the plurality of attachment features on the disclosed ROVs allow various combinations of attachments and provide an easy way to add, change, and/or replace parts to fit operational parameters. They also allow the user to customize and interchange parts to fit the user's preferences.

In addition, the components used with the disclosed ROVs do not require additive manufacturing. Instead, traditional manufacturing methods may be utilized in scaled production when the need for high on-demand availability for replacement parts and attachments decreases. The modular design also simplifies maintenance because individual components can be quickly changed in the field in the event of damage, and attachments, such as lights, stunning devices, suction devices, additional batteries, and sensors, may be included or removed as operating conditions require.

The disclosed ROVs also provides a lightweight design that improves speed and agility. Particularly, the vehicle's weight can be reduced by using a chassis that is largely open, which also allows the operator of the machine to maneuver the vehicle more effectively. This may allow the ROV to be agile and maneuver quickly to locate the target species. In addition, the specific orientation of thrusters on chassis may provide maximum degree of freedom, thereby improving agility and speed. The ROVs hydrodynamic profile and minimal frontal profile may also contribute to improved agility and speed.

The disclosed ROVs may also provide a precise and scalable harvest of fish in open ocean and aquaculture settings. Particularly, the goal is to target, incapacitate, and harvest selected specimens. By providing one or more suction devices at the front of the ROV and/or the rear of the ROV, suction capability and effectiveness may be improved. The disclosed ROVs may also be capable of gathering large amounts of target species at one time without having to go up, thereby improving scalability.

It will be apparent to those skilled in the art that various modifications and variations can be made to the remote operated vehicles and methods of the present disclosure. For example, other embodiments will be apparent to those skilled in the art from consideration of the specification and practice of the remote operated vehicles and methods disclosed herein. It is intended that the specification and examples be considered as exemplary only, with a true scope being indicated by the following claims and their equivalents.

What is claimed is:

1. A remote operated vehicle for selectively harvesting a target species in an aquatic environment, the vehicle comprising:
   a chassis defining a central channel and being configured to hold a plurality of attachments mounted to the chassis, wherein the plurality of attachments includes:
      at least one thruster configured to propel the vehicle in the aquatic environment; and
      at least one electronics containment unit configured to store one or more electronic devices for controlling an operation of the vehicle;
   a containment unit connected to the chassis and configured to store the target species during harvesting;
   at least one stunning device configured to stun the target species; and
   at least one suction device positioned at a rear portion of the chassis and being configured to generate flow in a direction extending through the channel to cause the target species to flow into the containment unit,
   wherein the plurality of attachments are mounted to the chassis via a plurality of attachment features, the plurality of attachment features including:
      at least one connecting rail having a groove configured to hold a dovetail joint attached to the at least one thruster;
      at least one cradle configured to hold the at least one electronics containment unit; and
      at least one clamp configured to secure the at least one electronics containment unit to the cradle.

2. The vehicle of claim 1, wherein the at least one stunning device includes:
   a pair of opposing arms extending from a front portion of the chassis to a position in front of the vehicle; and
   a pair of opposing electrodes attached to the arms and configured to generate electric current to stun the target species.

3. The vehicle of claim 1, wherein the at least one suction device is a first suction device, and the vehicle further includes a second suction device positioned at a front portion of the chassis and being configured to generate flow in the same direction as the first suction device.

4. The vehicle of claim 3, wherein the second suction device includes:

a pair of opposing arms extending from a front portion of the chassis to a position in front of the vehicle; and a pair of opposing spray heads attached to the arms and configured to spray fluid to generate a flow in the same direction as the first suction device; and a pair of hoses attached to the spray heads and configured to transfer fluid to the spray heads.

5. The vehicle of claim 3, wherein the second suction device includes a rim-driven propeller attached to a front portion of the chassis, the rim-driven propeller having an annular plate that extends around the periphery of the chassis, and a plurality of blades spaced around the annular plate and configured to generate a flow in the same direction as the first suction device.

6. The vehicle of claim 1, wherein the containment unit is surrounded by the chassis.

7. The vehicle of claim 1, wherein the containment unit extends from a rear portion of the chassis to a position behind the vehicle.

8. The vehicle of claim 7, further comprising a trapdoor attached to a rear portion of the chassis, such that the trapdoor is disposed between the chassis and the containment unit, wherein the at least one suction device is a thruster mounted to the trapdoor.

9. The vehicle of claim 1, wherein the at least one electronics containment unit may include a transparent body and a removable cap with a generally pointed nose.

10. A remote operated vehicle for selectively harvesting a target species in an aquatic environment, the vehicle comprising:

a chassis defining a central channel and being configured to hold a plurality of attachments mounted to the chassis, wherein the plurality of attachments includes:

at least one thruster configured to propel the vehicle in the aquatic environment; and at least one electronics containment unit configured to store one or more electronic devices for controlling an operation of the vehicle;

a containment unit connected to the chassis and configured to store the target species during harvesting;

at least one stunning device configured to stun the target species;

a first suction device positioned at a rear portion of the chassis and being configured to generate flow in a direction extending through the channel to cause the target species to flow into the containment unit; and a second suction device positioned at a front portion of the chassis and being configured to generate flow in the same direction as the first suction device.

11. The vehicle of claim 10, wherein the at least one stunning device includes:

a pair of opposing arms extending from a front portion of the chassis to a position in front of the vehicle; and a pair of opposing electrodes attached to the arms and configured to generate electric current to stun the target species.

12. The vehicle of claim 10, wherein the second suction device includes:

a pair of opposing arms extending from a front portion of the chassis to a position in front of the vehicle; and a pair of opposing spray heads attached to the arms and configured to spray fluid to generate a flow in the same direction as the first suction device; and a pair of hoses attached to the spray heads and configured to transfer fluid to the spray heads.

13. The vehicle of claim 10, wherein the second suction device includes a rim-driven propeller attached to a front portion of the chassis, the rim-driven propeller having an annular plate that extends around the periphery of the chassis, and a plurality of blades spaced around the annular plate and configured to generate a flow in the same direction as the first suction device.

14. The vehicle of claim 10, wherein the containment unit is surrounded by the chassis.

15. The vehicle of claim 10, wherein the containment unit extends from a rear portion of the chassis to a position behind the vehicle.

16. The vehicle of claim 15, further comprising a trapdoor attached to a rear portion of the chassis, such that the trapdoor is disposed between the chassis and the containment unit, wherein the at least one suction device is a thruster mounted to the trapdoor.

17. The vehicle of claim 10, wherein the plurality of attachments are mounted to the chassis via a plurality of attachment features, the plurality of attachment features including:

at least one connecting rail having a groove configured to hold a dovetail joint attached to the at least one thruster;

at least one cradle configured to hold the at least one electronics containment unit; and at least one clamp configured to secure the at least one electronics containment unit to the cradle.

18. The vehicle of claim 10, wherein the at least one electronics containment unit may include a transparent body and a removable cap with a generally pointed nose.

19. A method of operating a remote operated vehicle for selectively harvesting of a target species in an aquatic environment, the method comprising:

propelling the vehicle in the aquatic environment to locate the target species;

generating an electric current to stun the target species;

generating a first flow from a rear portion of the vehicle in a direction extending through a chassis of the vehicle;

generating a second flow from a front portion of the vehicle in the same direction as the first flow; and capturing the target species in a containment unit.

* * * * *